Dec. 10, 1929.  J. CAMPANELLA  1,738,691
DEVICE FOR MAKING LATHER
Filed Nov. 22, 1927
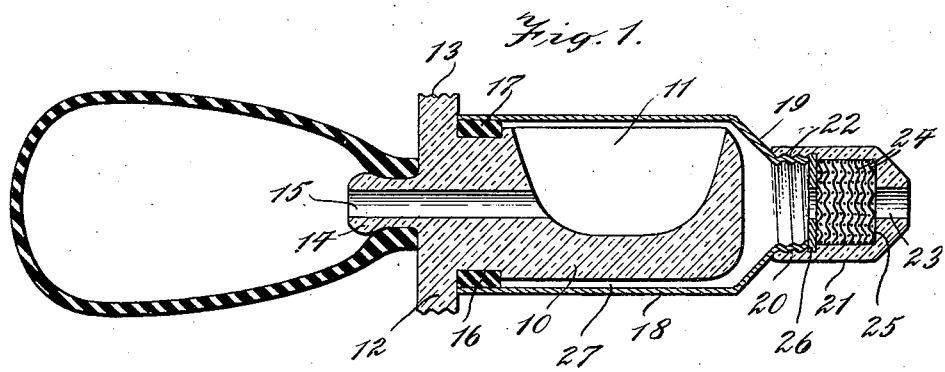
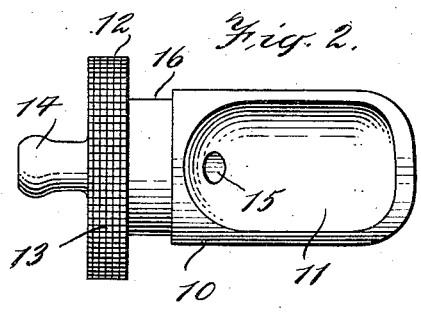
INVENTOR.
Joseph Campanella
BY
Gifford & Scull
ATTORNEYS.

Patented Dec. 10, 1929

1,738,691

UNITED STATES PATENT OFFICE

JOSEPH CAMPANELLA, OF NEW YORK, N. Y.

DEVICE FOR MAKING LATHER

Application filed November 22, 1927. Serial No. 235,046.

My invention more particularly relates to a sanitary device for making lather without the use of a brush.

My invention will best be understood by reference to the accompanying drawing, in which Fig. 1 is a longitudinal section through a lather making device embodying my invention, and Fig. 2 is a plan view of the body member of Fig. 1, with the casing removed.

Like reference characters indicate like parts throughout the drawing.

Referring now to the drawing, 10 is a body member preferably cylindrical in form throughout the major portion thereof and formed of any suitable material, preferably one that is readily cleaned, such as glass. The body member is scooped or hollowed out at one side to form a cup-shaped recess 11 which is adapted to receive lather forming material, preferably in the form of powdered soap, or soap in the form of a cream. The body member is provided, preferably at one end, with an annular flange 12 which is preferably milled on its periphery as at 13. The body member is also provided with a nipple 14, which is here shown as integral with the body member itself, but which, obviously, may be secured thereto by a suitable joint, and may, if desired, be formed of a material different from that of which the body member itself is formed. A passage 15 extends from the recess 11 through the nipple 14. The contracted portion of a bulb 141 is preferably received on the nipple 14.

The body member 10 is also preferably, though not necessarily, provided with a groove 16 located adjacent to the flange 12. A ring 17 of yielding material, such as rubber, is placed in the groove 16 and forms a tight joint therewith. A casing 18, preferably cylindrical throughout the major portion of its length, is received over and forms a tight joint with the ring 17, so that a tight joint is formed between the casing and the body member 18.

The front end of the casing 18 is preferably contracted as at 19, and the contracted end thereof is preferably screw-threaded as at 20, and receives a nozzle member 21 which is also provided with screw threads 22 to engage the screw threads on the contracted end 19 of the casing. A passage 23 extends through the nozzle.

At least one, and preferably a plurality of foraminous members 24, preferably in the form of rather fine wire mesh screens, arranged side by side, are received in the opening of the nozzle, the foremost foraminous member 24 being seated against a shoulder 25 formed in the nozzle, and the rear member being engaged by a disc or ring 26 provided with a central opening as indicated in Fig. 1, which is engaged by the contracted end of the casing and in turn secures the foraminous members in position. The casing 18 is preferably spaced as at 27 from the body member, thereby providing free and easy communication between the recess 11 in the body member and the nozzle.

A compressible member preferably in the form of a valveless rubber bulb, is received on the nipple 14 as indicated in Fig. 1, the rubber bulb preferably being adapted to receive and contain a liquid, such as water, which is adapted to make a lather forming mixture with the material in the recess 11. It will be understood that air may also be drawn into the bulb.

The operation of the device embodying my invention will readily be understood from the foregoing description, and is as follows:

The operator removes the casing and draws a certain amount of water into the bulb 141, which can readily be done without removing the bulb from the body member. He then places a suitable amount of lather forming material, preferably in the form of powdered soap or shaving cream, in the recess 11. This may be done by compressing the bulb and letting water run into the recess in the body member, then when pressure on the bulb is released, water is forced into the bulb. The casing is then placed in position over the body member, and the operator successively applies and releases pressure on the bulb, thereby causing water from the bulb to flow back and forth through the lather forming material in the recess in the body member until the soap or other lather forming material has gone into solution to form a lather forming mixture. Naturally, too much pressure should not be applied to the bulb, particularly at the beginning of the operation, as it will result in water or the lather forming mixture issuing from the nozzle before the mixture is in a proper condition for forming the lather.

When a proper lather forming mixture has been produced, a soapy foam will begin to form in the recess 11 and around the space between the casing and the body member, the bulk will be increased, and lather will issue from the nozzle, the formation of the lather being very greatly assisted by the presence of the foraminous members.

I claim:

1. In a lather making device, a body member provided with a recess adapted to receive lather making material and having a nipple and a passage extending from said recess through said nipple, a casing enclosing said recess and provided with a nozzle, means providing communication between said nozzle and said recess, and a compressible bulb adapted to be attached to said nipple and to contain a liquid, whereby the liquid may be forced to and from said bulb through the lather forming material in said recess.

2. In a lather making device, a body member provided with a recess adapted to receive lather making material and having a nipple and a passage extending from said recess through said nipple, a casing enclosing said recess and provided with a nozzle having a lather forming member placed therein, means providing communication between said nozzle and said recess, a compressible bulb adapted to be attached to said nipple and to contain a liquid, whereby the liquid may be forced from said bulb in succession through said passage, said recess and said nozzle.

3. In a lather making device, a body member provided with a recess adapted to receive lather making material and having a nipple and a passage extending from said recess to said nipple, a casing enclosing said recess and provided with a nozzle attached to said casing and fixed with reference thereto, means providing communication between said nozzle and said recess, and a compressible bulb adapted to be attached to said nipple and to contain a liquid, whereby the liquid may be forced to and from said bulb through the lather forming material in said recess.

4. In a lather making device, a receptacle adapted to contain lather forming material, a bulb attached thereto and adapted to contain fluid, said bulb being constructed and arranged to force said fluid back and forth to and from said bulb through said lather forming material, and lather forming means through which the material is forced from said receptacle.

5. In a lather making device, a body member provided with a receptacle adapted to contain a lather forming material, a casing surrounding said receptacle, a bulb attached to said device and communicating freely with said receptacle in both directions, whereby liquid contained in said bulb may be forced back and forth over said material to produce a lather forming liquid, and lather forming means communicating with said receptacle and with the atmosphere through which said lather forming material is forced.

JOSEPH CAMPANELLA.